Sept. 5, 1967

W. C. ANDERSON 3,340,387

INTEGRATING DEVICE

Filed April 3, 1963

INVENTOR.
Wilmer C. Anderson,
BY
Attorney.

Sept. 5, 1967

W. C. ANDERSON 3,340,387

INTEGRATING DEVICE

Filed April 3, 1963

INVENTOR.
Wilmer C. Anderson,
BY
Attorney.

Sept. 5, 1967

W. C. ANDERSON 3,340,387

INTEGRATING DEVICE

Filed April 3, 1963

INVENTOR.
Wilmer C. Anderson,
BY
Attorney.

United States Patent Office 3,340,387
Patented Sept. 5, 1967

3,340,387
INTEGRATING DEVICE
Wilmer C. Anderson, Greenwich, Conn., assignor to General Time Corporation, New York, N.Y., a corporation of Delaware
Filed Apr. 3, 1963, Ser. No. 270,249
19 Claims. (Cl. 235—150.3)

The present invenition relates to an integrating device and more specifically to a double-integrating device including single-integrating devices for providing an indication of the distance traversed in response to the application thereto of an analog signal representative of an acceleration measurement.

A primary object of this invention is to provide a device including only solid state elements for double-integrating an analog input signal. It is a more specific object of this invention to provide a device including only solid state elements for doubly integrating an analog input signal representative of an acceleration measurement so that an output signal representative of the distance traversed is provided. Accordingly, an object of this invention is to provide a device of such character for integrating an analog input signal representative of an acceleration measurement to provide an output representative of the velocity and for integrating the output representative of the velocity to provide an output representative of the distance traversed.

Another object of this invention is to provide an improved double-integrating device including single-integrating devices which employs only solid state elements and employs a novel counter arrangement for providing a digital output signal in response to the application thereto of an analog input signal.

A further object of this invention is to provide a double-integrating device including only solid state elements which is precise over a wide range of acceleration, final velocity and distance traversed. Thus, it is an object of this invention to provide a double-integrating device having no moving parts which is particularly utilizable in conjunction with missile, spaced probe and satellite control or the like, wherein it may be required to continuously operate for long periods of time on the order of days, months or years.

An additional object of this invention is to provide an improved single-integrating device including only solid state elements.

A general object of this invention is to provide a double-integrating device which is simple, economical and compact.

Other objects and advantages of this invention will become apparent upon reading the attached detailed description and upon reference to the drawings, in which.

While the invention has been described in connection with a certain preferred embodiment, it is to be understood that the invention is not to be limited to the disclosed embodiment, but on the contrary, the invention is intended to cover the various modifications and equivalent arrangements included within the spirit and scope of the appended claims.

In the drawings, flip-flops, AND gates, OR gates and AND-NOT gates have been symbolically illustrated. Since these elements are commonly utilized in the electronics art, the details thereof are not set forth. However, a brief description of the operation of these elements may be helpful in understanding the operation of the double-integrating device.

The flip-flops are illustrated as rectangles having two sections, one being marked S and the other being marked R. Inputs to the flip-flops are connected to the left-hand sides thereof and outputs are connected to the right-hand sides thereof. When an input signal or pulse is applied to the S section of a flip-flop, the flip-flop is set and a desired output signal is provided at the S output terminal only. When an input signal or pulse is applied to the R section of a flip-flop, the flip-flop is reset and a desired output signal is provided at the R output terminal only. When an input signal or pulse is applied to an input connected to the junction of the S and R sections of a flip-flop, the flip-flop is set in response to a first input signal or pulse and is reset in response to the next succeeding input signal or pulse, the switching action being continuous as input pulses are continuously applied thereto.

The AND gates have a control input terminal, an input terminal and an output terminal and are so designed that an output is provided at the output terminal when input signals are applied to the input terminal and the control terminal, i.e., the gate is open. The OR gates have input terminals and an output terminal and are so designed that an output is provided at the output terminal when an input is applied to at least one input terminal. The AND-NOT gates are AND gates that provide pulse phase inversion and are so designed that a desired output is not provided at the output terminal when inputs are applied to all the input terminals and a desired output is provided at the output terminal when an input is applied to at least one input terminal and no input is applied to at least one input terminal.

Figure 1:
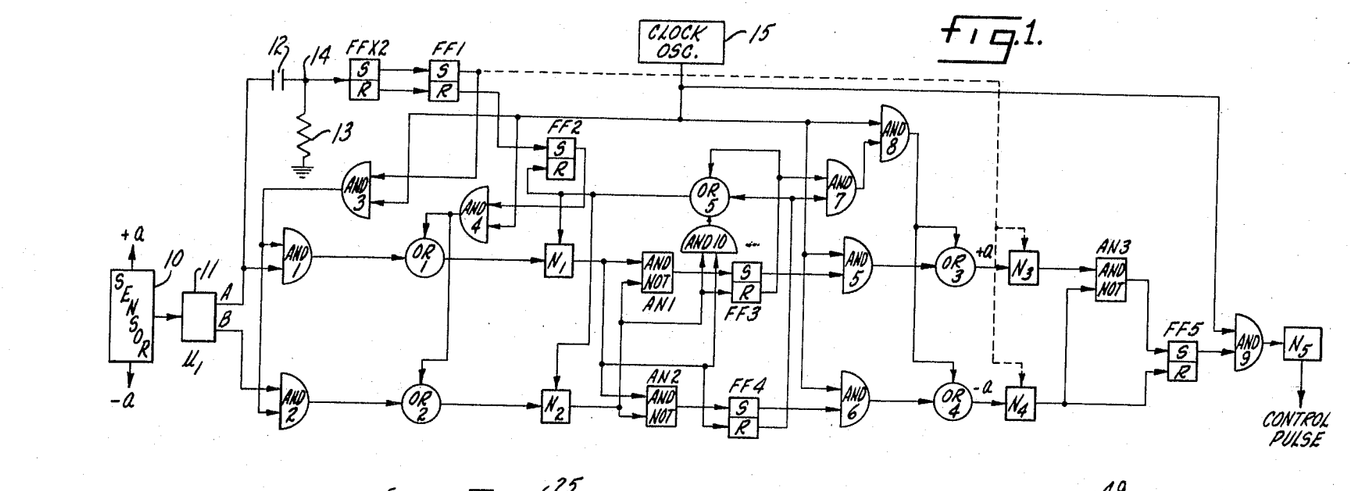
FIGURE 1 is a block diagram of a double-integrating device constructed in accordance with the present invention.

Referring now to the drawings and more specifically to FIG. 1, a sensor 10 is provided which measures the acceleration of a desired accelerating device and delivers an analog output signal of current or voltage which is proportional to the measured acceleration. Many devices of this character are conmercially available and, therefore, the details of the sensor need not be described.

In accordance with the present invention, a device including only solid-state elements is provided for double-integrating analog output signals provided by the sensor 10 so that an output representative of the distance traversed by the accelerating device is provided. More specifically, a device including only solid-state elements is provided for integrating the analog output signal of the sensor 10 so that an output representative of velocity is provided and for integrating the output representative of the velocity so that an output representative of the distance traversed by the accelerating device is provided. The double-integrating device includes first means cyclically operable during the period of an analog input signal for providing a series of pulses wherein the number of pulses provided during each cycle is representative of the instantaneous acceleration. A first acceleration counter is provided for cumulatively counting the number of pulses representative of positive accelerations and a second acceleration counter is provided for cumulatively counting the number of pulses representative of negative accelerations. Additionally, second means are operative at the completion of each cycle of the first means for providing a series of pulses equal in number to the instantaneous differential count in the first and second acceleration counters, the number of pulses provided by the second means being equal to the differential accumulation of numbers of pulses representative of positive and negative accelerations times the time periods thereof and corresponding to the integral of the analog input signals so that it represents the instantaneous velocity of the device. A velocity counter is provided for cumulatively counting the number of pulses provided by the second means, the cumulative count in the velocity counter being equal to the accumulation of numbers of pulses representative of the velocities times the time periods thereof and corresponding to the double integral of the analog input signal so that the cumulative count represents the distance traversed by the device.

Though the double-integrating device is set forth as double-integrating an analog signal representative of the acceleration of a device, it is to be understood that it is intended to cover the double-integration of any analog signal.

The first means for providing a series of pulses representative of the instantaneous acceleration of the device includes a magnetic oscillator 11 and a pair of control counter circuits.

The magnetic oscillator 11 which has an input and a pair of outputs, designated as A and B, is connected to the output of the sensor 10 for providing a pair of cyclical output signals at prescribed rates, and controls the transmission of pulses from a clock oscillator 15 to the control counter circuits. When no analog output signal is provided by the sensor 10, symmetrical wave output signals are provided at the magnetic oscillator outputs A and B which are the inverse of each other. When an analog output signal is provided by the sensor 10, asymmetrical square wave output signals are provided at the magnetic oscillator outputs A and B which are the inverse of each other, long positive-going pulses separated by short negative-going pulses being provided at output A with the inverse at output B when a positive analog output signal is provided by the sensor 10 and short positive-going pulses separated by long negative-going pulses being provided at output A with the inverse at output B when a negative analog output signal is provided by the sensor 10. The pair of control counter circuits include counters $N_1$ and $N_2$, AND-NOT gates AN 1 and AN 2, and flip-flops FF3 and FF4 and control the transmission of series of pulses representative of the instantaneous acceleration from the clock oscillator 15 to acceleration counters $N_3$ and $N_4$.

Output A of the magnetic oscillator 11 is connected to the common S-R input terminal of a scale-of-two flip-flop FF X2 through the combination of a resistor 12 and a capacitor 13, the resistor-capacitor combination operating as a differentiator to provide a spike like pulse at terminal 14 for each transition of a square wave signal provided at output A. The flip-flop FF X2 is so designed that it is alternately driven to the set condition and to the reset condition by succeeding positive input signals and is referred to as a scale-of-two flip-flop since it only responds to every other input pulse applied thereto, i.e., is driven through one complete cycle of operation for every two cycles of the magnetic oscillator output signals. The S output terminal of the flip-flop FF X2 is connected to the S input terminal of a flip-flop FF1 so that the flip-flop FF1 is set when the flip-flop FF X2 is set and the R output terminal of the flip-flop FF X2 is connected to the R input terminal of the flip-flop FF1 so that the flip-flop FF1 is reset when the flip-flop FF X2 is reset.

The flip-flop FF1 controls the transmission of pulses from the clock oscillator 15 through a gate or switch AND 3 to gates or switches AND 1 and AND 2, the S output terminal of the flip-flop FF1 being connected to the input control terminal of the gate AND 3 and the output signal provided at the S output terminal when the flip-flop FF1 is set opening the gate AND 3. The pulses passing from the clock oscillator 15 through the gate AND 3 are transmitted to input terminals of the gates AND 1 and AND 2 which are controlled by output signals provided at outputs A and B of the magnetic oscillator 11. Output A of the magnetic oscillator 11 is connected to the input control terminal of the gate AND 1 and the gate AND 1 is opened to permit the passage of pulses therethrough when a positive signal is provided at output A. Output B of the magnetic oscillator 11 is connected to the input control terminal of the gate AND 2 and the gate AND 2 is opened to permit the passage of pulses therethrough when a positive signal is provided at output B. The pulses passing through the gates AND 1 and AND 2 respectively pass through OR gates OR 1 and OR 2 to the counters $N_1$ and $N_2$. The counters $N_1$ and $N_2$ are so designed that they are filled in response to the application thereto of a predetermined number of input pulses and an output pulse is provided thereby when filled.

Thus, it may be seen that the number of pulses passing through the gates AND 1 and AND 2 and being counted in the counters $N_1$ and $N_2$ are dependent on the time periods of the positive pulses provided at outputs A and B of the magnetic oscillator 11. If no analog signal is provided by the sensor 10, the time periods of the positive pulses provided at outputs A and B are equal and, therefore, the same number of pulses are counted in the counters $N_1$ and $N_2$ during alternate cycles of the output signals provided at outputs A and B as determined by operation of the scale-of-two flip-flop FF X2. If an analog output signal is provided by the sensor 10 indicating the detection of an acceleration, the time periods of the positive pulses provided at outputs A and B are asymmetrically related in accordance with the amplitude of the analog signal, which in turn is dependent on the instantaneous value of acceleration. Therefore, a different number of pulses are counted in the counters $N_1$ and $N_2$ during alternate cycles of the output signals at outputs A and B while an acceleration is detected, wherein the differential count during alternate cycles is representative of the instantaneous acceleration detected by the sensor 10.

The R output terminal of the flip-flop FF1 is connected to the S input terminal of a flip-flop FF2 so that the flip-flop FF2 is set when the flip-flop FF1 is reset, the flip-flop FF1 being reset during alternate cycles of the output flop signals at outputs A and B of the magnetic oscillator 11 as determined by operation of the scale-of-two flip-flop FFX2. The flip-flop FF2 is provided to control the transmission of pulses from the clock oscillator 15 through a gate AND 4 and the pulses passing through the gates OR 1 and OR 2 to the counters $N_1$ and $N_2$. The S output terminal of the flip-flop FF2 is connected to the input control terminal of the gate AND 4 so that the gate is opened to permit passage of pulses therethrough when the flip-flop FF2 is set. The pulses passing through the gate AND 4 to the counters $N_1$ and $N_2$ supplement the pulses previously transmitted to the counters $N_1$ and $N_2$ through the gates AND 1 and AND 2 and these supplementary pulses cause the counters $N_1$ and $N_2$ to be filled so that the output pulses are provided thereby.

Thus, it may be seen that, during one cycle of the output signals provided at the outputs A and B of the magnetic oscillator 11, pulses are transmitted through gates AND 1 and AND 2 to the respective counters $N_1$ and $N_2$ so that the counters are partially filled and, during the next succeeding cycle, pulses are transmitted through gate AND 4 to both the counters $N_1$ and $N_2$ so that the counters are filled and output pulses are provided thereby.

The output of the counter $N_1$ is connected to input terminals of the AND-NOT gates AN 1 and AN 2, to a gate AND 10, and to the R input terminal of the flip-flop FF4, the flip-flop FF4 normally being in the reset condition. The output of the counter $N_2$ is connected to input terminals of the AND-NOT gates AN 1 and AN 2, to the gate AND 10, and to the R input terminal of the flip-flop FF3, the flip-flop FF3 also normally being in the reset condition.

If an output pulse is provided by counter $N_1$ before an output pulse is provided by the counter $N_2$ in response to pulses transmitted through gate AND 4, indicating that a positive acceleration was detected by the sensor 10 and therefore indicating that the time period of the positive pulse provided that output A was greater than the time period of the positive pulse provided at output B so that a greater number of pulses passed through gate AND 1 than through gate AND 2 during the next preceding cycle of the output signals at outputs A and B, an output signal is provided by the AND-NOT gate AN 1 which is transmitted to the S input terminal of the flip-flop FF3 causing the flip-flop FF3 to be set. The S output terminal of the flip-flop FF3 is connected to an input control terminal of a gate AND 5 and, when the flip-flop FF3 is set, the gate AND 5 is opened so that pulses from the clock oscillator 15 pass therethrough and through a gate OR 3 to the acceleration counter $N_3$, the counter $N_3$ being the positive acceleration counter. Subsequently, when an output pulse is provided by the counter $N_2$, the AND-NOT gate AN 1 is rendered inoperative and the output pulse is transmitted to the R input terminal of the flip-flop FF3 causing the flip-flop FF3 to be reset so that the gate AND 5 is closed and the transmission of pulses to the counter $N_3$ ceases. The number of pulses transmitted to the counter $N_3$ is equal to the differential count provided in the counters $N_1$ and $N_2$ in response to the transmission of pulses through the gates AND 1 and AND 2. When the flip-flop FF3 is reset, an output signal is transmitted from the R output terminal thereof through a gate OR 5 to reset input terminals of the counters $N_1$ and $N_2$ so that the counters are reset to initial conditions and to the R input terminal of the flip-flop FF2 causing the flip-flop FF2 to be reset so that the transmission of pulses through the gate AND 4 ceases.

If an output pulse is provided by the counter $N_2$ before an output pulse is provided by the counter $N_1$ in response to pulses transmitted through gate AND 4, indicating that a negative acceleration was detected by the sensor 10 and therefore indicating that the time period of the positive pulse provided at output B was greater than the time period of the positive pulse provided at output A so that a greater number of pulses passed through gate AND 2 than through gate AND 1 during the next preceding cycle of the output signals at outputs A and B, an output signal is provided by the AND-NOT gate AN 2 which is transmitted to the S input terminal of the flip-flop FF4 causing the flip-flop FF4 to be set. The S output terminal of the flip-flop FF4 is connected to an input control terminal of a gate AND 6 and, when the flip-flop FF4 is set, the gate AND 6 is opened so that pulses from the clock oscillator 15 pass therethrough and through a gate OR 4 to the acceleration counter $N_4$, the counter $N_4$ being the negative acceleration counter. Subsequently, when an output pulse is provided by the counter $N_1$, the AND-NOT gate AN 2 is rendered inoperative and the output pulse is transmitted to the R input terminal of the flip-flop FF4 causing the flip-flop FF4 to be reset so that gate AND 6 is closed and the transmission of pulses from the clock oscillator 15 therethrough ceases. When the flip-flop FF4 is reset, an output pulse is transmitted from the R output terminal thereof through the gate OR 5 to the reset input terminals of the counters $N_1$ and $N_2$ so that the counters are reset to initial conditions and to the R input terminal of the flip-flop FF2 causing the flip-flop FF2 to be reset so that the transmission of pulses through gate AND 4 ceases.

The counters $N_3$ and $N_4$ are provided to cumulatively count the differential number of pulses representative of accelerations counted by the counters $N_1$ and $N_2$ during alternate cycles of the output signals provided at the outputs A and B of the magnetic oscillator, the differential count at any instant in the counters $N_3$ and $N_4$ being equal to the differential accumulation of numbers of pulses representative of positive and negative accelerations times the time periods thereof and corresponding to the integral of the analog input signals so that it represents the instantaneous velocity of the accelerating device. The counters $N_3$ and $N_4$ are so designed that output pulses are provided thereby when filled and the counters are automatically reset to initial conditions when filled.

When both the flip-flops FF3 and FF4 are reset, a gate AND 7 is opened since the input terminals thereof are respectively connected to the R output terminals of the flip-flops FF3 and FF4 and an output pulse is transmitted from the output thereof to an input control terminal of a gate AND 8 causing the gate AND 8 to open so that pulses from the clock oscillator 15 pass therethrough and through the gates OR 3 and OR 4 to both of the counters $N_3$ and $N_4$. In response to the pulses passing through the gate AND 8, the counters $N_3$ and $N_4$ are filled so that output pulses are provided thereby, the pulses passing through the gate AND 8 supplementing the pulses previously transmitted to the counters $N_3$ and $N_4$ through the respective gates AND 5 and AND 6. The counters $N_3$ and $N_4$ reset themselves when filled so that the same differential count is maintained therein when pulses are applied thereto through gate AND 8. The gate AND 8 is maintained open as long as the flip-flops FF3 and FF4 remain in the reset conditions, and the gate AND 8 is closed when one of the flip-flops is set so that pulses are not simultaneously transmitted through gate AND 8 and gate AND 5 or AND 6.

The outputs of the counters $N_3$ and $N_4$ are connected to input terminals of an AND-NOT gate AN 3. If an output pulse is provided by the counter $N_3$ before an output pulse is provided by the counter $N_4$, indicating that the instantaneous velocity of the accelerating device is positive, an output pulse is provided by the AND-NOT gate AN 3 which is transmitted to the S input terminal of a flip-flop FF5 causing the flip-flop FF5 to be set. When the flip-flop FF5 is set, an output signal is provided at the S output terminal thereof which is transmitted to the control terminal of a gate AND 9 causing the gate AND 9 is to be opened so that pulses from the clock oscillator 15 pass therethrough to a counter $N_5$. Subsequently, when an output pulse is provided by the counter $N_4$, the output pulse is transmitted to the R input terminal of the flip-flop FF5 causing the flip-flop FF5 to be reset so that the transmission of pulses through the gate AND 9 ceases. The number of pulses passing through the gate AND 9, each time gate AND 9 is opened, is equal to the instantaneous differential count in the counters $N_3$ and $N_4$ and is representative of the instantaneous velocity of the accelerating device as previously set forth.

The counter $N_5$ is provided to cumulatively count the numbers of pulses transmitted through the gate AND 9, the cumulative count being equal to the accumulation of numbers of pulses representative of the velocities times the time periods thereof and corresponding to the double integral of the analog input signals so that the cumulative count represents the distance traversed by the accelerating device.

When output pulses are simultaneously provided by the counters $N_1$ and $N_2$ the AND-NOT gate AN 1 and AN 2 are rendered inoperative so that no output signals are provided thereby and a gate AND 10 is opened so that an output pulse is transmitted therefrom through the gate OR 5 to the R input terminal of flip-flop FF2 and to the reset terminals of the counters $N_1$ and $N_2$ so that resetting thereof is accomplished.

When output pulses are simultaneously provided by the counters $N_3$ and $N_4$, the AND-NOT gate AN 3 is rendered inoperative so that no output signal is provided thereby and the flip-flop FF5 is maintained reset so that no pulses are permitted to pass through gate AND 9. It should be noted that an output can not be provided by the counter $N_4$ before an output is provided by the counter $N_3$ since a device must always accelerate in the positive direction before it can decelerate an equal amount, i.e., accelerate in the negative direction.

Figure 4:
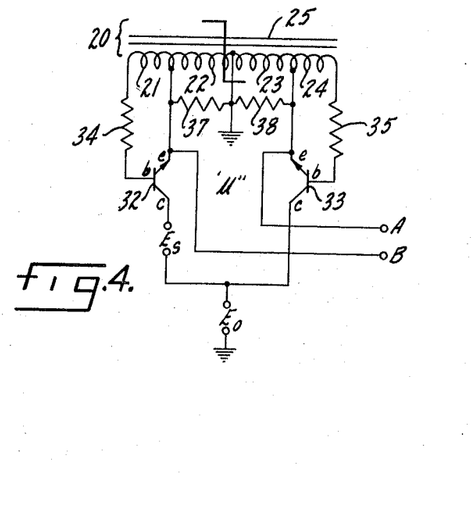
FIG. 4 is a schematic diagram of a magnetic oscillator utilized in the double-integrating device of FIG. 1.

Referring to FIG. 4, a schematic diagram of the magnetic oscillator 11 is illustrated utilizing a saturable transformer 20 having windings 21–24 wound on a core 25. The core is formed of a readily saturable magnetic material having a generally rectangular hysteresis loop, such material being commercially sold by G. L. Electronics Company under the name "Orthonik" type P1040. For driving the core 25 into its opposite condition of saturation which may, for convenience, be termed "positive" and "negative" saturation, the windings 22 and 23, which are control windings, are energized by transistors 32 and 33. The transistors 32 and 33 are shown as being of the NPN type though it should be understood that, with appropriate changes in the polarity of the applied biases, PNP type transistors could be used as is well known in the art. The windings 22 and 23 are connected between ground and the emitter terminals of the respective transistors 32 and 33, and shunting resistors 37 and 38 are connected across the windings 22 and 23 to provide a damping effect. The windings 21 and 24 constitute auxiliary windings employed to excite the base or input terminals of the transistors 32 and 33. The windings 21 and 24 are connected to the base terminals of the respective transistors 32 and 33 through resistors 34 and 35 and the emitter to base differential potential for each of the transistors is determined by the voltage drop across the associated auxiliary winding and resistor.

A voltage source designated as $E_o$ provides energizing potential for the magnetic oscillator 11, the voltage source $E_o$ being connected directly to the collector of the transistor 33 and being connected to the collector of the transistor 32 through an auxiliary voltage supply designated as $E_s$. The voltage $E_s$ is provided at the output of the sensor 10 and therefore the value of the voltage $E_s$ is determined by the acceleration detected by the sensor.

In operation of the magnetic oscillator, application of voltage $E_o$ causes both of the transistors to tend to conduct, but because of the unbalance in the circuit due to inherent characteristics thereof or due to an output voltage $E_s$ being provided by the sensor 10, one of the transistors will normally tend to conduct more heavily than the other. Conduction in the predominating transistor induces a voltage in the associated control winding which is in such a direction as to forward bias the predominating transistor so that the predominating transistor tends to conduct more heavily while the other transistor tends to conduct less and becomes nonconductive. Conduction through the predominating transistor causes the core to be saturated and, when saturation is reached, the rate of change of flux decreases, hence the induced voltage decreases. By transformer action, the bias voltage on the conducting transistor also diminishes, hence the current in this transistor decreases so that the transistor becomes nonconducting. The decaying current induces a voltage across the auxiliary winding of the other transistor in a direction such that the other transistor is rendered conductive. Conduction in the other transistor is in a direction to increase the induced forward bias so that the other transistor conducts current heavily to drive the core into the condition of opposite, or negative saturation. When saturation is reached, and slightly exceeded, the resulting reduction in current reduces the bias of the then-conducting transistor but increases the forward bias of the opposite transistor so that the core is driven back to a condition of positive saturation. This oscillation continues, first one of the transistors conducting and then the other, at a frequency which is determined by the transformer geometry and the applied voltages.

Figure 5:
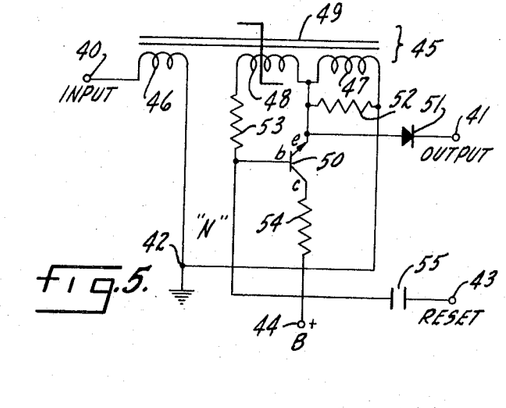
FIG. 5 is a schematic diagram of a magnetic counter which may be utilized in the double-integrating device of FIG. 1.

Referring to FIG. 5, a magnetic counter suitable for use in the present circuit is illustrated which is commercially available under the trade name "Incremag" and is described in U.S. Patent 2,897,380, issued July 28, 1959, to C. Neitzert. The counter has an input terminal 40, an output terminal 41, a ground terminal 42 and a reset terminal 43. Power is supplied to the counter through terminal 44 by a positive power supply designated as B. The heart of the counter is a saturable reactor 45 having an input winding 46, an output winding 47 and a triggering winding 48 wound on a core 49. A transistor 50 having a base, an emitter and a collector, designated as $b$, $e$ and $c$, has its input circuit connected across the triggering winding 48 and has its output circuit connected in series with the output winding 47.

The material of the core 49 is so chosen that when an input pulse is applied to the input winding 46, the magnetization of the core is advanced one step from negative saturation toward the condition of positive saturation. When a predetermined number of input pulses have been applied to the input winding, as determined by the volt-second content thereof, the saturation of the core is exceeded, i.e., the core is set, and, when the last pulse is removed, the sudden collapse of the excess flux induces a voltage in the triggering winding 48 which is in a direction to initiate conduction in the transistor 50. The resulting flow of current in the output winding 47 induces a voltage in the triggering winding 48 which causes still further current to flow through the transistor output circuit to a point where a condition of negative saturation is achieved in the core of the reactor, i.e., the core is reset. When the transistor 50 is rendered conductive, the potential at the emitter rises and an output signal is transmitted therefrom through a diode 51 to the output terminal 41. When the core has been driven back to the condition of negative saturation, the counter is conditioned to receive a new series of input pulses. The core may also be reset by applying a positive pulse to terminal 43 which renders the transistor 50 conductive, the terminal 43 being connected to the transistor base through a capacitor 55.

To prevent operation of the transistor 50 in response to small changes in flux which occur during each step of advancement toward saturation, a damping resistor 52 is connected in parallel with the output winding 47. Moreover, to limit the base current of the transistor in the face of a large voltage induced in the triggering winding, a series resistor 53 is used. Finally, there is provided in series with the collector of the transistor 50 a low value resistor 54 for the purpose of limiting the reset current, which not only tends to protect the transistor, but which also limits the load which is placed upon the power supply B.

It should be noted that any desired number of counters, such as that illustrated in FIG. 5, may be connected in tandem so that a desired number of input pulses are required to be provided before an output pulse is provided by the tandem arrangement, as disclosed in the above-mentioned Neitzert patent.

Figure 2:
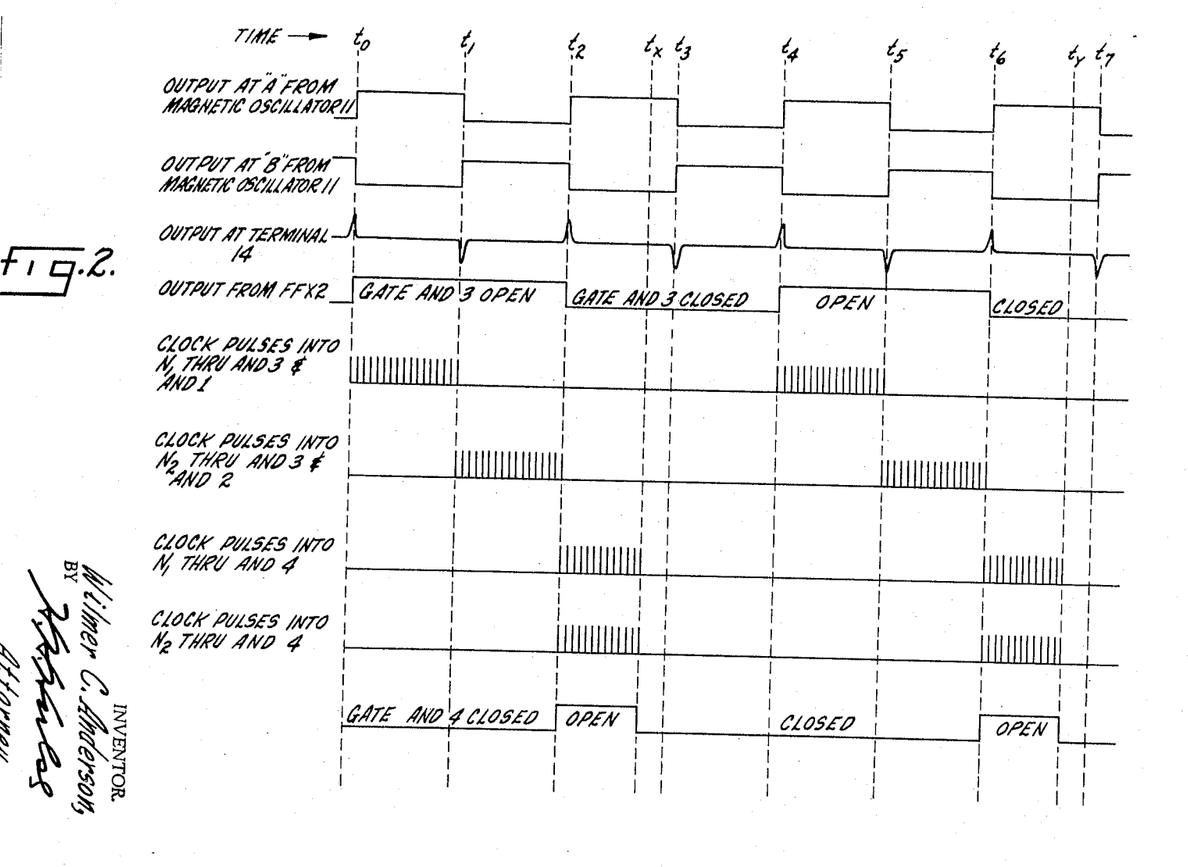
FIG. 2 illustrates wave forms at selected points in the double-integrating device of FIG. 1 when no analog input signal is provided.
Figure 3:
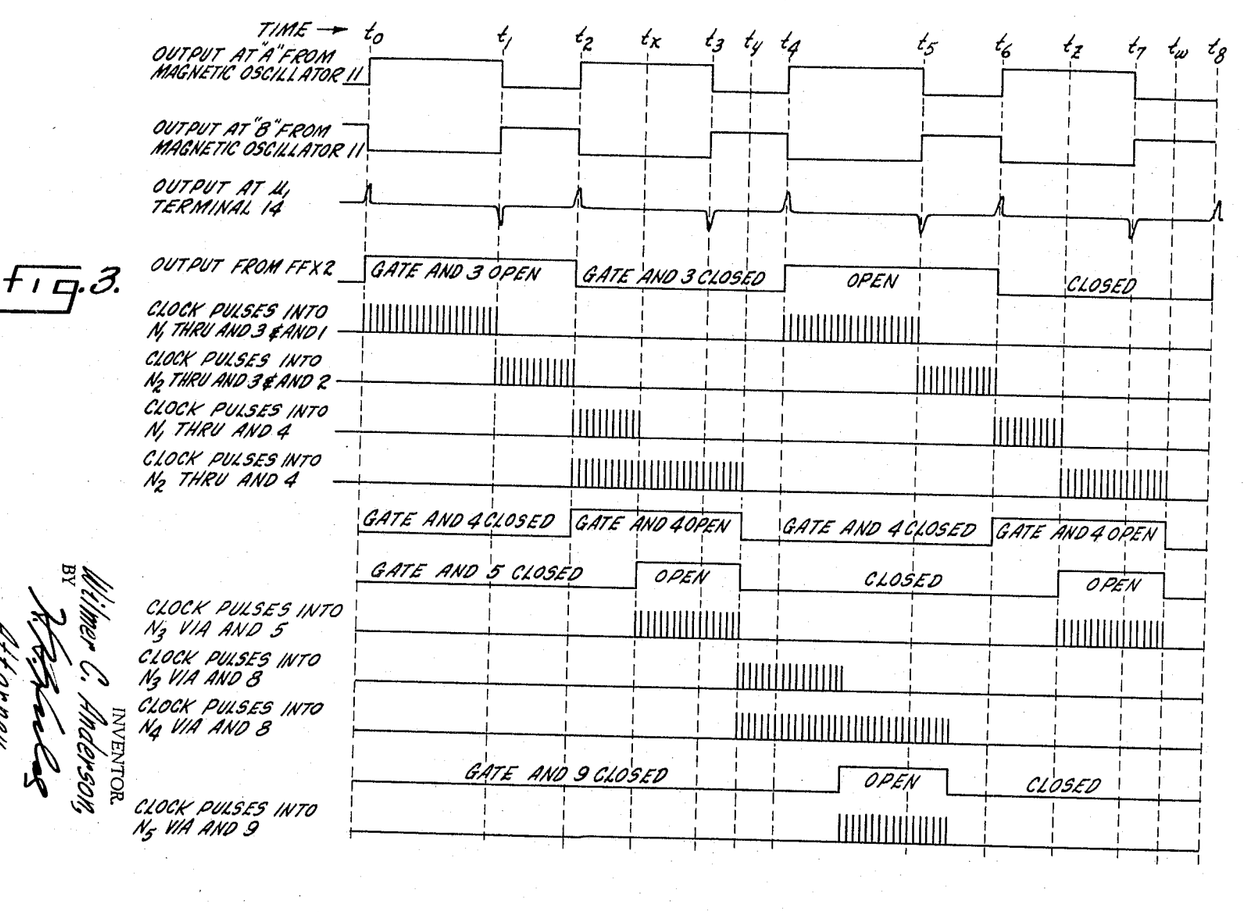
FIG. 3 illustrates wave forms at selected points in the double-integrating device of FIG. 1 when an analog input signal is provided.

For operation of the above-described double-integrating device, reference is made to FIGS. 2 and 3, FIG. 2 illustrating operation when no analog output signal is provided by the sensor 10 and FIG. 3 illustrating operation when an analog output signal is provided by the sensor 10.

Referring first to FIG. 2, no analog output signal is provided by the sensor 10, indicating the detection of no acceleration, and the outputs at the output terminals A and B of the magnetic oscillator 11 are inverse symmetrical square waves as illustrated by the wave forms. Assuming that the operation begins at a time designated as $t_0$, a positive-going output is provided at output terminal A which is differentiated by the combination of capacitor 12 and resistor 13 so that a positive-going output pulse is provided at terminal 14. The positive-going output pulse at terminal 14 causes the flip-flop FFX2 to be driven to the set condition so that the flip-flop FF1 is driven to the set condition and the gate AND 3 is opened to permit pulses to pass from the clock oscillator 15 to the gates AND 1 and AND 2. The flip-flop FFX2 will remain in the set condition until the next subsequent positive-going pulse is provided at the terminal 14 which occurs at time $t_2$. Between times $t_0$ and $t_1$, the signal at output A of the magnetic oscillator 11 is positive-going so that pulses are permitted to pass through the gate AND 1 and through the gate OR 1 to the counter $N_1$. Between times $t_1$ and $t_2$, the signal at output B of the magnetic oscillator 11 is positive going so that pulses are permitted to pass through the gate AND 2 and through the gate OR 2 to the counter $N_2$. Since the elapsed time between $t_0$ and $t_1$ is equal to the elapsed time between $t_1$ and $t_2$, an equal number of pulses are transmitted to the counters $N_1$ and $N_2$ from the clock oscillator 15.

At time $t_2$, when the next subsequent positive pulse is provided at terminal 14, the flip-flop FFX2 is reset causing the flip-flop FF1 to be reset so that the gate AND 3 is closed and the passage of pulses therethrough ceases. When flip-flop FF1 is reset, the flip-flop FF2 is set causing gate AND 4 to open so that pulses pass therethrough from the clock oscillator 15 and through the gates OR 1 and OR 2 to the counters $N_1$ and $N_2$. The counters $N_1$ and $N_2$ will be filled at the same time, indicated at time $t_x$, to provide an output pulse since the same number of pulses were applied thereto through the gates AND 1 and AND 2 and the same number of pulses are applied thereto through the gate AND 4.

When simultaneous output pulses are provided by the counters $N_1$ and $N_2$, the AND-NOT gates AN 1 and AN 2 are rendered inoperative so that no output pulses are provided thereby and the gate AND 10 is opened. When the gate AND 10 is opened, an output signal is transmitted therefrom through the OR gate OR 5 to cause resetting of the flip-flop FF2 so that the gate AND 4 is closed and to cause the counters $N_1$ and $N_2$ to be reset. Since the flip-flops FF3 and FF4 are in the reset conditions, the gate AND 7 is open and provides an output signal which causes the gate AND 8 to be open so that pulses are permitted to pass from the clock oscillator 15 through gate AND 8 and through the gates OR 3 and OR 4 to the counters $N_3$ and $N_4$. The same number of pulses will be transmitted to the counters $N_3$ and $N_4$ and therefore simultaneous output pulses will be provided thereby since the counters $N_3$ and $N_4$ will be filled at the same time. When simultaneous output pulses are provided by the counters $N_3$ and $N_4$, the AND-NOT gate AN 3 is rendered inoperative so that an output pulse is not provided thereby and the output pulse from the counter $N_4$ maintains the flip-flop FF5 in the reset condition so that the gate AND 9 is maintained closed and no pulses are permitted to pass from the clock oscillator 15 to the counter $N_5$.

The above-mentioned cycle will continue to repeat itself as indicated between time $t_4$ and time $t_7$ in FIG. 2 until an acceleration is detected by the sensor 11.

Referring to FIG. 3, an analog output signal is provided by the sensor 10, indicating the detection of a positive acceleration, which causes inverse asymmetrical square wave output signals to be provided at outputs A and B of the magnetic oscillator 11 wherein the positive-going portions of the signal at output A have a time period which is greater than the positive-going portions of the signal at output B. Assuming that operation begins at a time designated as $t_0$, a positive-going output is provided at output terminal A which is differentiated by the combination of capacitor 12 and resistor 13 so that a positive-going output pulse is provided at terminal 14. The positive-going output pulse at terminal 14 causes the flip-flop FFX2 to be set so that flip-flop FF1 is set and the gate AND 3 is opened to permit pulses to pass from the clock oscillator 15 to the gates AND 1 and AND 2. The flip-flop FFX2 is again remaining set until the next positive-going pulse is provided at terminal 14 which occurs at time $t_2$. Between times $t_0$ and $t_1$, the signal at output A of the magnetic oscillator 11 is positive-going so that pulses are permitted to pass through the gate AND 1 and the gate OR 1 to the counter $N_1$. Between times $t_1$ and $t_2$, the signal at output B of the magnetic oscillator 11 is positive-going so that pulses are permitted to pass through the gate AND 2 and the gate OR 2 to the counter $N_2$. Since the time between $t_0$ and $t_1$ is greater than the time between $t_1$ and $t_2$, a greater number of pulses are permitted to pass through the gate AND 1 to the counter $N_1$ than through the gate AND 2 to the counter $N_2$ so that the count in the counter $N_1$ is greater than the count in the counter $N_2$.

At time $t_2$, when the next subsequent positive-going pulse is provided at terminal 14, the flip-flop FF X2 is reset causing the flip-flop FF1 to be reset so that the gate AND 3 is closed and the passage of pulses therethrough ceases. When the flip-flop FF1 is reset, the flip-flop FF2 is set causing gate AND 4 to open so that pulses are permitted to pass therethrough from the clock oscillator 15 and through gates OR 1 and OR 2 to the counters $N_1$ and $N_2$, these pulses causing the counters $N_1$ and $N_2$ to be filled. Counter $N_1$ will be filled sooner than counter $N_2$ since a greater number of pulses were permitted to pass through the gate AND 1 than through the gate AND 2, the counters being respectively filled as indicated at times $t_x$ and $t_y$. When an output pulse is provided by counter $N_1$, the AND-NOT gate AN 1 is rendered operative so that an output pulse is provided thereby which causes the flip-flop FF3 to be set. When the flip-flop FF3 is set, the gate AND 5 is opened so that pulses are permitted to pass therethrough and through the gate OR 3 to the counter $N_3$. Subsequently, when an output pulse is provided by the counter $N_2$, the AND-NOT gate AN 1 is rendered inoperative and the flip-flop FF3 is reset so that the gate AND 5 is closed and no further pulses are permitted to pass therethrough to the counter $N_3$. Also, when the flip-flop FF3 is reset, the flip-flop FF2 is reset causing the gate AND 4 to be closed so that no subsequent pulses are permitted to pass therethrough to the counters $N_1$ and $N_2$ and the counters $N_1$ and $N_2$ are reset. The count in the counter $N_3$ will correspond to the differential count provided in the counters $N_1$ and $N_2$ as a result of the passage of pulses through the gates AND 1 and AND 2.

Since both of the flip-flops FF3 and FF4 are reset, an output is provided by the gate AND 7 which causes the gate AND 8 to be opened so that pulses pass therethrough and through the gates OR 3 and OR 4 to the counters $N_3$ and $N_4$ causing the counters $N_3$ and $N_4$ to be filled. Counter $N_3$ will be filled before counter $N_4$ so that an output pulse is provided thereby which renders the AND-NOT gate AN 3 operative. When the AND-NOT gate AN 3 is rendered operative, an output signal is provided thereby which sets the flip-flop FF5 so that the gate AND 9 is opened and pulses are permitted to pass therethrough to the counter $N_5$. Subsequently, when an output pulse is provided by the counter $N_4$, the flip-flop FF5 is reset causing the gate AND 9 to be closed so that no further pulses are permitted to pass therethrough. As previously set forth, the cumulative count in the counter $N_5$ represents the double integral of the analog output signal provided by the sensor 10 which is the distance traversed by the accelerating device.

The above-mentioned cycle will continue to repeat itself as indicated between times $t_6$ and $t_8$ in FIG. 3 until a change in acceleration is detected by the sensor 11.

It should be noted that a portion of the double-integrating device may be modified so as to be utilizable as an analog to digital converter. Under such circumstances, an output will be provided which is representative of merely the amplitude of an analog input signal. Counters $N_3$ and $N_4$ may be of the commercial type which provide visual indications of the count therein, and reset terminals of the counters $N_3$ and $N_4$ may be connected to the S output terminal of the flip-flop FF1 as indicated by the dotted connection therebetween. Then, the indications of the counters $N_3$ and $N_4$ during each cycle of operation would be digital representations of analog input signal amplitudes and the counters $N_3$ and $N_4$ would be reset when the flip-flop FF1 is set.

Thus, it may be seen that a double-integrating device has been provided which utilizes only solid state elements. More specifically, it may be seen that a device of this type has been provided for integrating analog input signals representative of the acceleration of a device to provide an output representative of the instantaneous velocity thereof and for integrating the instantaneous velocity outputs to provide an output representative of the distance traversed by the device. Accordingly, a single-integrating device has been provided utilizing only solid state elements.

Referring to FIGS. 6–10, simplified block diagrams of single-integrating and double-integrating devices are shown, these devices merely being illustrative of the many modifications of integrating devices which may be constructed in accordance with the teachings set forth in the foregoing description of FIG. 1. The details of the elements illustrated in block form are not set forth in detail since they merely consist of portions of the circuit illustrated in FIG. 1.

Figures 6, 7, 8:
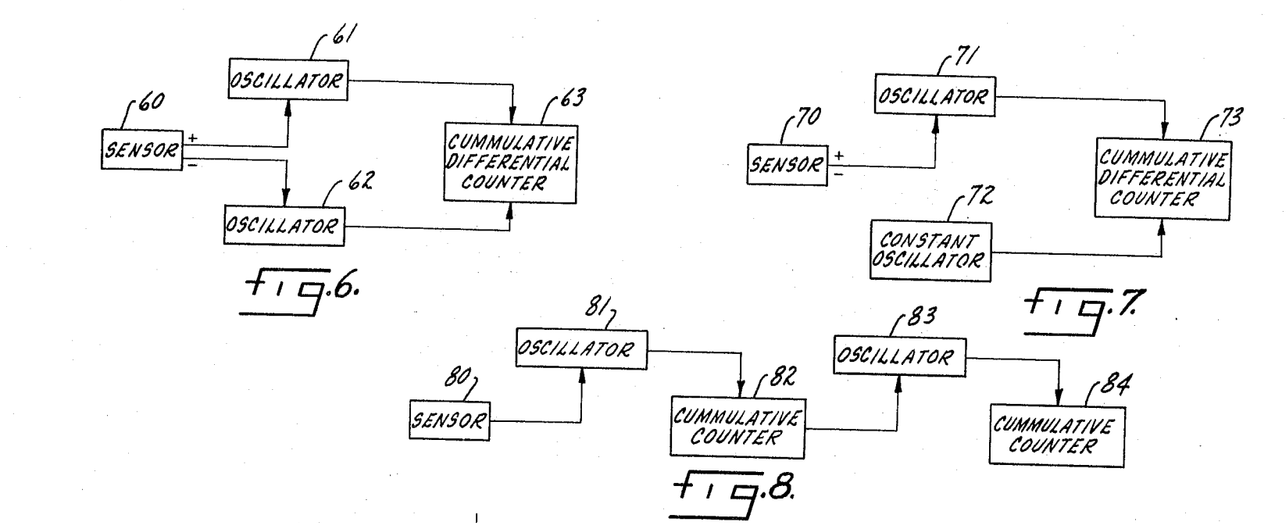
FIG. 6 is a simplified block diagram of a two way single-integrating device constructed in accordance with the teachings of the present invention.
FIG. 7 is a simplified block diagram of a two way single-integrating device constructed in accordance with the teachings of the present invention.
FIG. 8 is a simplified block diagram of a single way double-integrating device constructed in accordance with the teachings of the present invention.

FIG. 6 illustrates a two way single-integrating device, i.e., an integrating device responsive to positive and negative analog input signals. A sensor 60, which is similar to sensor 10 in FIG. 1, is provided for producing an analog output signal representative of the acceleration of a desired accelerating device. The positive analog output signals are transmitted to a first oscillator 61 and the negative analog output signals are transmitted to a second oscillator 62, the analog signals controlling the frequencies of the oscillators. The outputs of the oscillators 61 and 62 are in turn transmitted to inputs of a cumulative differential counter 63 which is provided to count the number of pulses or cycles of the output signals provided by the oscillators 61 and 62, the counter 63 adding pulses provided by the oscillator 61 and subtracting pulses provided by the oscillator 62. The cumulative count in the counter 63 is representative of the integral of the analog input signals provided by the sensor 60.

Referring to FIG. 7, a single-integrating device is illustrated which is similar to the integrating device in FIG. 6. In this instance, the positive and negative analog output signals provided by a sensor 70 are transmitted to a first oscillator 71 to cause the frequency of the oscillator to vary above and below a reference frequency. A second oscillator 72 is provided for producing a constant frequency output corresponding to the reference frequency. The outputs of the oscillators 71 and 72 are in turn transmitted to input terminals of a cumulative differential counter 73 which counts the differential pulses or cycles of the output signals provided by oscillators 71 and 72, the cumulative count therein being representative of the integral of the analog output signals provided by the sensor 70.

A single way double-integrating device is illustrated in block form in FIG. 8, the device not being capable of distinguishing between positive and negative analog output signals provided by a sensor 80. In this case, the analog output signals provided by the sensor 80 are transmitted to a first oscillator 81 to control the output frequency thereof and a first cumulative counter is provided for counting the pulses or cycles of the output signal provided by the first oscillator 81. A second oscillator 83 is associated with the cumulative counter 82 and the frequency thereof is dependent upon the cumulative count in the counter 82. A second cumulative counter 84 is provided for cumulatively counting the pulses or cycles of the output signal provided by the oscillator 83, the cumulative count therein being representative of the double integral of the analog input signals provided by the sensor 80.

Figure 9:
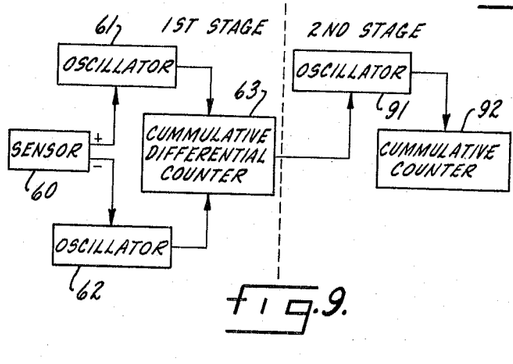
FIG. 9 is a simplified block diagram of a two way double-integrating device constructed in accordance with the teachings of the present invention.

A two way double-integrating device is illustrated in FIG. 9 which has a first stage corresponding to the single-integrating device illustrated in FIG. 6 so that the count in the cumulative differential counter 63 is representative of the integral of analog input signals. A second oscillator 91, in a second stage, is associated with the cumulative differential counter 63 and the output frequency thereof is dependent upon the cumulative differential count in the counter 63. A second cumulative counter 92 is provided for counting the pulses or cycles of output signals provided by the oscillator 91, the cumulative count therein being representative of the double integral of analog input signals provided by the sensor 60.

Figure 10:
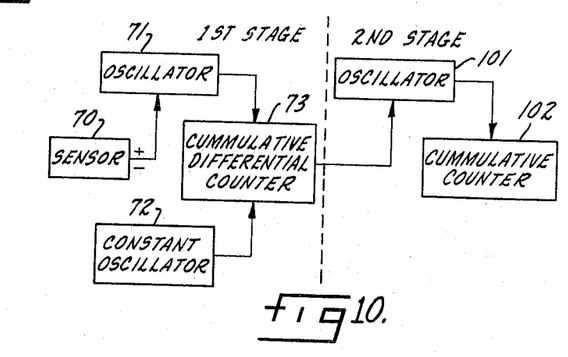
FIG. 10 is a simplified block diagram of a two way double-integrating device constructed in accordance with the teachings of the present invention.

Referring to FIG. 10, a two-way double-integrating device is illustrated which has a first stage corresponding to the single-integrating device illustrated in FIG. 7 so that the count in the cumulative differential counter 73 is representative of the integral of analog input signals. A second oscillator, in a second stage, is associated with the cumulative differential counter 73 and the output frequency thereof is dependent upon the cumulative count in the counter 73. A second cumulative counter 102 is provided for counting the pulses or cycles of output signals provided by the second oscillator 101, the cumulative count therein being representative of the second integral of analog output signals provided by the sensor 70.

Thus, it may be seen that various modifications of integrating devices may be provided which fall within the spirit and scope of the present invention as set forth in the appended claims, these modifications including single and double-integrating devices, and the present invention is not intended to be limited to the disclosed modifications which are merely representative modifications.

I claim as my invention:

1. In a device for double-integrating analog input signals, the combination which comprises, a first oscillator for producing a cyclical output signal, means for varying the frequency of the first oscillator in accordance with the amplitude of an analog input signal, a first counter for cumulatively counting the output cycles of the first oscillator, a second oscillator for producing a cyclical output signal, means for varying the frequency of the second oscillator in accordance with the cumulative count in the first counter, and a second counter for cumulatively counting the output cycles of the second oscillator, the count in the second counter being a measure of the second integral of the analog input signal.

2. In a device for double-integrating analog input signals, the combination which comprises a first counter for cumulatively counting the number of pulses applied thereto, first means for applying pulses to the first counter at a rate dependent upon the amplitude of an analog input signal, a second counter for cumulatively counting the number of pulses applied thereto, and second means for applying a series of pulses to the second counter at a rate dependent upon the instantaneous count in the first counter, the count in the second counter corresponding to the double integral of the analog input signal.

3. In a device for double-integrating analog input signals capable of varying in opposite directions from a reference value, the combination which comprises, first and second oscillators for producing output pulses at a reference frequency, means for coupling an analog input signal to the oscillators and for equally and oppositely varying the frequencies thereof from the reference value depending upon the sense of the analog input signal, a differential counter having first and second input terminals coupled to the oscillators and having an output terminal whereat an output signal is produced in accordance with the differential number of impulses received at the input terminals, an output oscillator for producing output pulses, means for varying the frequency of the output oscillator in accordance with the differential count provided by the differential counter, and an output counter for cumulatively counting the pulses provided by the output oscillator as a measure of the second integral of the analog input signal.

4. In a device for double-integrating an analog input signal capable of varying in opposite directions from a reference value, the combination which comprises, first and second oscillators for producing output pulses at a reference frequency, means for coupling the analog input signal to one of the oscillators and for varying the frequency thereof above and below the reference value depending upon the sense of the analog input signal, a differential counter having first and second input terminals coupled to the oscillators and having an output terminal whereat an output signal is produced in accordance with the differential number of impulses received at the input terminals, an output oscillator for producing output pulses, means for varying the frequency of the output oscillator in accordance with the differential count provided by the differential counter, and an output counter for cumulatively counting the pulses provided by the output oscillator as a measure of the second integral of the analog input signal.

5. In a device for double-integrating analog input signals capable of varying in opposite directions from a reference value, the combination which comprises, first and second oscillators for producing output pulses at a reference frequency, means for coupling an analog input signal to one of the oscillators depending upon the sense of the analog input signal and for varying the frequency thereof from the reference value in accordance with the amplitude of the analog input signal, a differential counter having first and second input terminals coupled to the oscillators and having an output terminal whereat an output signal is produced in accordance with the differential number of impulses received at the input terminals, an output oscillator for producing output pulses, means for varying the frequency of the output oscillator in accordance with the differential count provided by the differential counter, and an output counter for cumulatively counting the pulses provided by the output oscillator as a measure of the second integral of the analog input signal.

6. In a device for double-integrating analog input signals, the combination which comprises, first and second counters for cumulatively counting the number of pulses applied thereto, first means rendered operable by a negative analog input signal for applying a series of pulses to the first counter at a rate dependent upon the amplitude of the analog input signal, second means rendered operable by a positive analog input signal for applying a series of pulses to the second counter at a rate dependent upon the amplitude of the analog input signal, a third counter for cumulatively counting the number of pulses applied thereto, and means for applying a series of pulses to the third counter at a rate dependent upon the differential count in the first and second counters, the count in the third counter corresponding to the double integral of the analog input signals.

7. In a device for double-integrating analog input signals, the combination which comprises, first and second counters for cumulatively counting the number of pulses applied thereto, first means including a magnetic oscillator rendered operable by a negative analog input signal for applying a series of pulses to the first counter at a rate dependent upon the amplitude of the analog input signal, second means including a magnetic oscillator rendered operable by a positive analog input signal for applying a series of pulses to the second counter at a rate dependent upon the amplitude of the analog input signal, a third counter for cumulatively counting the number of pulses applied thereto, and means for applying a series of pulses to the third counter at a rate dependent upon the differential count in the first and second counters, the count in the third counter corresponding to the double integral of the analog input signals.

8. In a device for double-integrating analog input signals, the combination which comprises, first and second counters for cumulatively counting the number of pulses applied thereto and for providing output pulses when filled, the counters automatically resetting themselves when filled, first means rendered operable by a negative analog input signal for cyclically applying a series of pulses to the first counter at a rate dependent upon the amplitude of the analog input signal, second means rendered operable by a positive analog input signal for cyclically applying a series of pulses to the second counter at a rate dependent upon the amplitude of the analog input signal, third means operable at the completion of each cycle of the first and second means for applying a continuous train of pulses to the first and second counters until a subsequent cycle begins, a third counter for cumulatively counting the number of pulses applied thereto, and fourth means responsive to an output pulse from the first counter only for applying a series of pulses to the third counter until an output pulse is provided by the second counter, the count in the third counter corresponding to the double integral of the analog input signals.

9. In a device for measuring the distance traversed by an accelerated device, the combination which comprises, a first oscillator for producing a cyclical output signal, means associated with the accelerated device for varying the frequency of the first oscillator in accordance with the acceleration of the device, a first counter for cumulatively counting the output cycles of the first oscillator, a second oscillator for producing a cyclical output signal, means for varying the frequency of the second oscillator in accordance with the cumulative count in the first counter, and a second counter for cumulatively counting the output cycles of the second oscillator, the count in the second counter being a measure of the distance traversed by the accelerated device.

10. In a device for measuring the distance traversed by an accelerated device, the combination which comprises, a first pulse generator for producing cyclical output pulses, means associated with the accelerated device for varying the frequency of the first pulse generator in accordance with the acceleration of the device, a first counter for cumulatively counting the output pulses of the first pulse generator, a second pulse generator for producing cyclical output pulses, means for varying the frequency of the second pulse generator in accordance with the cumulative count in the first counter, and a second counter for cumulatively counting the output pulses of the second pulse generator, the count in the second counter being a measure of the idstance traversed by the accelerated device.

11. In a device for measuring the distance traversed by an accelerated device, the combination which comprises, first means cyclically operable at a prescribed frequency during the period of acceleration of the device for providing a series of pulses wherein the number of pulses provided during each cycle is representative of the instantaneous acceleration, a first counter for cumulatively counting the number of pulses provided by the first means representative of positive accelerations, a second counter for cumulatively counting the number of pulses provided by the first means representative of negative accelerations, second means operative at the completion of each cycle of the first means for providing a series of pulse equal in number to the instantaneous differential count in the first and second counters, and a third counter for cumulatively counting the number of pulses provided by the second means, the cumulative count in the third counter corresponding to the distance traversed by the accelerated device.

12. In a device for measuring the distance traversed by an accelerated device, the combination which comprises, first means cyclically operable at a prescribed frequency during the period of acceleration of the device for providing a series of pulses wherein the number of pulses provided during each cycle is representative of the instantaneous acceleration, a first counter for receiving pulses provided by the first means representative of positive acceleration and for providing an output pulse when filled, a second counter for receiving pulses provided by the first means representative of negative acceleration and for providing an output pulse when filled, the counters resetting themselves when filled, second means operable at the completion of each cycle of the first means for applying a continuous train of pulses to the first and second counters until the first means begins the next cycle of operation, a third counter for counting the number of pulses applied thereto, and third means responsive to an output pulse being provided by the first counter only for applying a series of pulses to the third counter until an output pulse is provided by the second counter, the count in the third counter corresponding to the distance traversed by the accelerated device.

13. In a device for measuring the distance traversed by an accelerated device, the combination which comprises, first means for providing a pair of inverse asymmetrical alternating output signals in response to acceleration of the device and for providing a pair of inverse symmetrical alternating output signals when the device is not accelerated, the first means output signals consisting of positive-going and negative-going pulses, first and second counters for counting the number of pulses applied thereto, second means responsive to alternate positive-going pulses of one of said output signals of the first means for applying a series of pulses to the first counter and responsive to alternate positive-going pulses of the other of said output signals of the first means for applying a series of pulses to the second counter, the number of pulses being representative of the time periods of the positive-going pulses, third and fourth counters for counting the number of pulses applied thereto, third means operative at the completion of each operation of the second means for applying a series of pulses equal in number to the differential count in the first and second counters to the third counter when the count in the first counter is greater than the count in the second counter and to the fourth counter when the count in the second counter is greater than the count in the first counter, a fifth counter for counting the number of pulses applied thereto, and fourth means operative at the completion of each operation of the third means for resetting the first and second counters to initial conditions and for applying a series of pulses equal in number to the instantaneous differential count in the third and fourth counters to the fifth counter, the cumulative count in the fifth counter corresponding to the distance traversed by the accelerated device.

14. In a device for integrating analog input signals capable of varying in opposite directions from a reference value, the combination which comprises, first and second oscillators for producing cyclical output pulses at a reference frequency, means for coupling an analog input signal to the oscillators and for equally and oppositely varying the frequencies thereof from the reference value depending upon the sense of the analog input signal, and a differential counter having first and second input terminals coupled to the oscillators and having an output terminal whereat an output signal is produced in accordance with the differential number of impulses received at the input terminals.

15. In a device for integrating analog input signals capable of varying in opposite directions from a reference value, the combination which comprises, first and second oscillators for producing cyclical output pulses at a reference frequency, means for coupling an analog input signal to one of the oscillators depending upon the sense of the analog input signal and for varying the frequency thereof from the reference value in accordance with the amplitude of the analog input signal, and a differential counter having first and second input terminals coupled to the oscillators and having an output terminal whereat an output signal is produced in accordance with the differential number of impulses received at the input terminals.

16. In a device for integrating an analog input signal capable of varying in opposite directions from a reference value, the combination which comprises, first and second oscillators for producing cyclical output pulses at a reference frequency, means for coupling the analog input signal to only one of the oscillators and for varying the frequency thereof above and below the reference value depending upon the sense of the analog input signal, a differential counter having first and second input terminals coupled to the oscillators and having an output terminal whereat an output signal is produced in accordance with the differential number of impulses received at the input terminals.

17. In a device for integrating analog input signals applied thereto, the combination which comprises, first and second cumulative counters for counting the number of pulses applied thereto, first means rendered operative by a positive analog input signal for applying pulses to the first counter at a rate dependent upon the amplitude of the analog input signal, second means rendered operative by a negative analog input signal for applying pulses to the second counter at a rate dependent upon the amplitude of the analog input signal, and means for providing an output representative of the instantaneous differential count in the first and second counters, the output being representative of the integral of the analog input signals.

18. In a device for double-integrating analog input signals, the combination which comprises, first means for providing a pair of inverse asymmetrical alternating output signals in response to an analog input signal and for providing a pair of inverse symmetrical alternating output signals in the absence of an analog input signal, the first means output signals consisting of positive-going and negative-going pulses, first and second counters for counting the number of pulses applied thereto, second means responsive to alternate positive-going pulses of one of said output signals of the first means for applying a series of pulses to the first counter and responsive to alternate positive-going pulses of the other of said output signals of the first means for applying a series of pulses to the second counter, the number of pulses being representative of the time periods of the positive-going pulses, third and fourth counters for counting the number of pulses applied thereto, third means operative at the completion of each operation of the second means for applying a series of pulses equal in number to the differential count in the first and second counters to the third counter when the count in the first counter is greater than the count in the second counter and to the fourth counter when the count in the second counter is greater than the count in the first counter, a fifth counter for counting the number of pulses applied thereto, and fourth means operative at the completion of each operation of the third means for resetting the first and second counters to initial conditions and for applying a series of pulses equal in number to the instantaneous differential count in the third and fourth counters to the fifth counter, the cumulative count in the fifth counter corresponding to the double-integral of the analog input signal.

19. In a device for integrating analog input signals, the combination which comprises, first means for providing a pair of inverse asymmetrical alternating output signals in response to an analog input signal and for providing a pair of inverse symmetrical alternating output signals in the absence of an analog input signal, the first means output signals consisting of positive-going and negative-going pulses, first and second counters for counting the number of pulses applied thereto, second means responsive to alternate positive-going pulses of one of said output signals of the first means for applying a series of pulses to the first counter and responsive to alternate positive-going pulses of the other of said output signals of the first means for applying a series of pulses to the second counter, the number of pulses being representative of the time periods of the positive-going pulses, third and fourth counters both counting the number of pulses applied thereto, third means operative at the completion of each operation of the second means for applying a series of pulses equal in number to the differential count in the first and second counters to the third counter when the count in the first counter is greater than the count in the second counter and to the fourth counter when the count in the second counter is greater than the count in the first counter, said differential count corresponding to the integral of said analog input signal.

References Cited

UNITED STATES PATENTS

| | | | |
|---|---|---|---|
| 2,927,735 | 3/1960 | Scuitto | 235—150.3 X |
| 3,033,043 | 5/1962 | Runft | 235—92 |
| 3,046,792 | 7/1962 | Morgan | 235—92 |
| 3,193,216 | 7/1965 | Fischel | 235—150.25 X |
| 3,230,358 | 1/1966 | Davis et al. | 235—183 |

MALCOLM A. MORRISON, *Primary Examiner.*

K. W. DOBYNS, *Assistant Examiner.*